(12) United States Patent
Gillette et al.

(10) Patent No.: US 12,094,238 B2
(45) Date of Patent: Sep. 17, 2024

(54) OPTICAL CONSTRUCTIONS FOR DISPLAY SYSTEMS

(71) Applicant: 3M INNOVATIVE PROPERTIES COMPANY, St. Paul, MN (US)

(72) Inventors: Kristy A. Gillette, Spring Valley, WI (US); Zhaohui Yang, North Oaks, MN (US); Encai Hao, Woodbury, MN (US); William J. Gray, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/195,475

(22) Filed: May 10, 2023

(65) Prior Publication Data
US 2023/0368569 A1    Nov. 16, 2023

Related U.S. Application Data

(60) Provisional application No. 63/342,219, filed on May 16, 2022.

(51) Int. Cl.
*G06K 9/00*    (2022.01)
*G02B 3/00*    (2006.01)
(Continued)

(52) U.S. Cl.
CPC ....... *G06V 40/1324* (2022.01); *G02B 3/0056* (2013.01); *G02B 5/003* (2013.01); *G02B 5/208* (2013.01)

(58) Field of Classification Search
CPC ............. G06V 40/1324; G06V 10/147; G02B 3/0056; G02B 5/003; G02B 5/208; H01L 27/14627
(Continued)

(56) References Cited

U.S. PATENT DOCUMENTS 11,335,129 B2    5/2022  Li
2012/0235263 A1*  9/2012  Ogita ................ H01L 27/14627
                                                     257/E31.127
(Continued)

FOREIGN PATENT DOCUMENTS

CN    110333607 A    10/2019
CN    111989690 A    11/2020
(Continued)

*Primary Examiner* — Abdul-Samad A Adediran
(74) *Attorney, Agent, or Firm* — Robert S. Moshrefzadeh

(57) ABSTRACT

An integral optical construction includes a lens layer including a structured first major surface having a plurality of microlenses. An optically opaque mask layer is disposed on the lens layer and defines a plurality of openings. Each of the openings extends from a first major surface of the mask layer facing the lens layer to an opposite second major surface of the mask layer. The openings are in a one-to-one correspondence with the microlenses. Regions of the mask layer between the openings have an optical density of greater than about 2 for at least a first visible wavelength in a visible wavelength range. An optical adhesive layer is disposed on, and makes physical contact with, the second major surface of the mask layer. The optical adhesive layer defines a recess at each of the openings. The recess includes a closed bottom and an opposite open top open to the opening.

9 Claims, 5 Drawing Sheets

(51) Int. Cl.
  *G02B 5/00*  (2006.01)
  *G02B 5/20*  (2006.01)
  *G06V 40/13*  (2022.01)

(58) Field of Classification Search
  USPC .................................................. 257/E31.127
  See application file for complete search history.

(56) References Cited

U.S. PATENT DOCUMENTS

| | | |
|---|---|---|
| 2020/0184246 A1 | 6/2020 | Fan |
| 2020/0210671 A1 | 7/2020 | Ling et al. |
| 2021/0116714 A1 | 4/2021 | Chen et al. |
| 2021/0133421 A1 | 5/2021 | Zeng et al. |
| 2021/0358983 A1 | 11/2021 | Iwata et al. |
| 2022/0050994 A1* | 2/2022 | Zhang .................. G06V 10/147 |
| 2022/0164561 A1 | 5/2022 | Dai et al. |
| 2022/0180653 A1 | 6/2022 | Bouthinon et al. |
| 2022/0246875 A1 | 8/2022 | Saracco et al. |

FOREIGN PATENT DOCUMENTS

| | | | |
|---|---|---|---|
| CN | 112143399 A | 12/2020 | |
| CN | 112466921 A | 3/2021 | |
| CN | 110832362 B | 1/2022 | |
| CN | 110175492 B | 3/2022 | |
| CN | 113065445 B | 4/2023 | |
| FR | 3094531 B1 | 1/2023 | |
| WO | 2020158663 A1 | 8/2020 | |
| WO | 2021008980 A1 | 1/2021 | |
| WO | 2021017342 A1 | 2/2021 | |
| WO | 2021110875 A1 | 6/2021 | |

* cited by examiner

OPTICAL CONSTRUCTIONS FOR DISPLAY SYSTEMS

TECHNICAL FIELD

The present disclosure generally relates to optical constructions, particularly to optical constructions for display systems, such as fingerprint sensing display systems.

BACKGROUND

Optical systems, such as display systems, fingerprint sensing systems and biometric systems, utilize one or more optical layers for managing incident light. Often, the optical layers are required to have a desired optical transmittance, optical haze, optical clarity, and index of refraction. A number of leading smartphone brands are exploring full-screen fingerprint sensing to simplify device access and enhance security. The enabling technologies include optical sensors embedded in displays in combination with requisite light control to obtain a fingerprint image of sufficient resolution. During the manufacture of certain display systems, rigid substrates, such as a liquid crystal display (LCD) and a cover lens, are optically coupled to each other by an optically clear adhesive (OCA). In many cases, a touch sensor is also introduced between the LCD and the cover lens. The presence of the OCA improves the performance of the display by reducing the refractive index mismatch between substrates and the air gap while also providing structural support to the assembly.

SUMMARY

Some aspects of the disclosure relate to an integral optical construction including a lens layer including a structured first major surface having a plurality of microlenses arranged two-dimensionally across the lens layer. An optically opaque mask layer is disposed on the lens layer and defines a plurality of through physical first openings therein. Each of the first openings extends from a first major surface of the mask layer facing the lens layer to an opposite second major surface of the mask layer. The first openings are in a one-to-one correspondence with the microlenses. Regions of the mask layer between the first openings have an optical density of greater than about 2 for at least a first visible wavelength in a visible wavelength range extending from about 420 nm to about 680 nm. A first optical adhesive layer is disposed on, and makes physical contact with, the second major surface of the mask layer. The first optical adhesive layer defines a recess therein at each of the first openings. The recess includes a closed bottom and an opposite open top open to the first opening.

Other aspects of the disclosure relate to a display system for sensing a finger of a user applied to the display system. The display system includes a display panel disposed on, and substantially coextensive in length and width, with the integral optical construction of one or more embodiments disclosed herein. The display panel is configured to display an image for viewing by the user.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIG. 1 schematically shows a cross-sectional view of a display system having a stacked optical construction in accordance with one or more embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

In the following detailed description, reference is made to the accompanying drawings that form a part hereof, and in which are shown by way of illustration several specific embodiments. It is to be understood that other embodiments are contemplated and may be made without departing from the scope or spirit of the present disclosure.

Collimation films and IR/visible light blocking layers have been developed, for instance, in organic light emitting diode (OLED) fingerprint sensing (FPS) applications. The optical construction typically includes an air gap between an optical stack and the OLED panel and are affixed using optically clear adhesives (OCAs). Embodiments described herein are applicable to full active area sensing detection systems with a fully bondable sensing solution.

Some embodiments describe an optical stack using OCA to influence the performance of an optical stack including microlens and aperature array for fingerprint sensing. Desired optical performance of the display system can be obtained by either filling the apertures with OCA or maintaining air inside the apertures. In some cases, the performance can be further influenced by addition of IR absorbing dyes into these OCAs.

Figure 1:
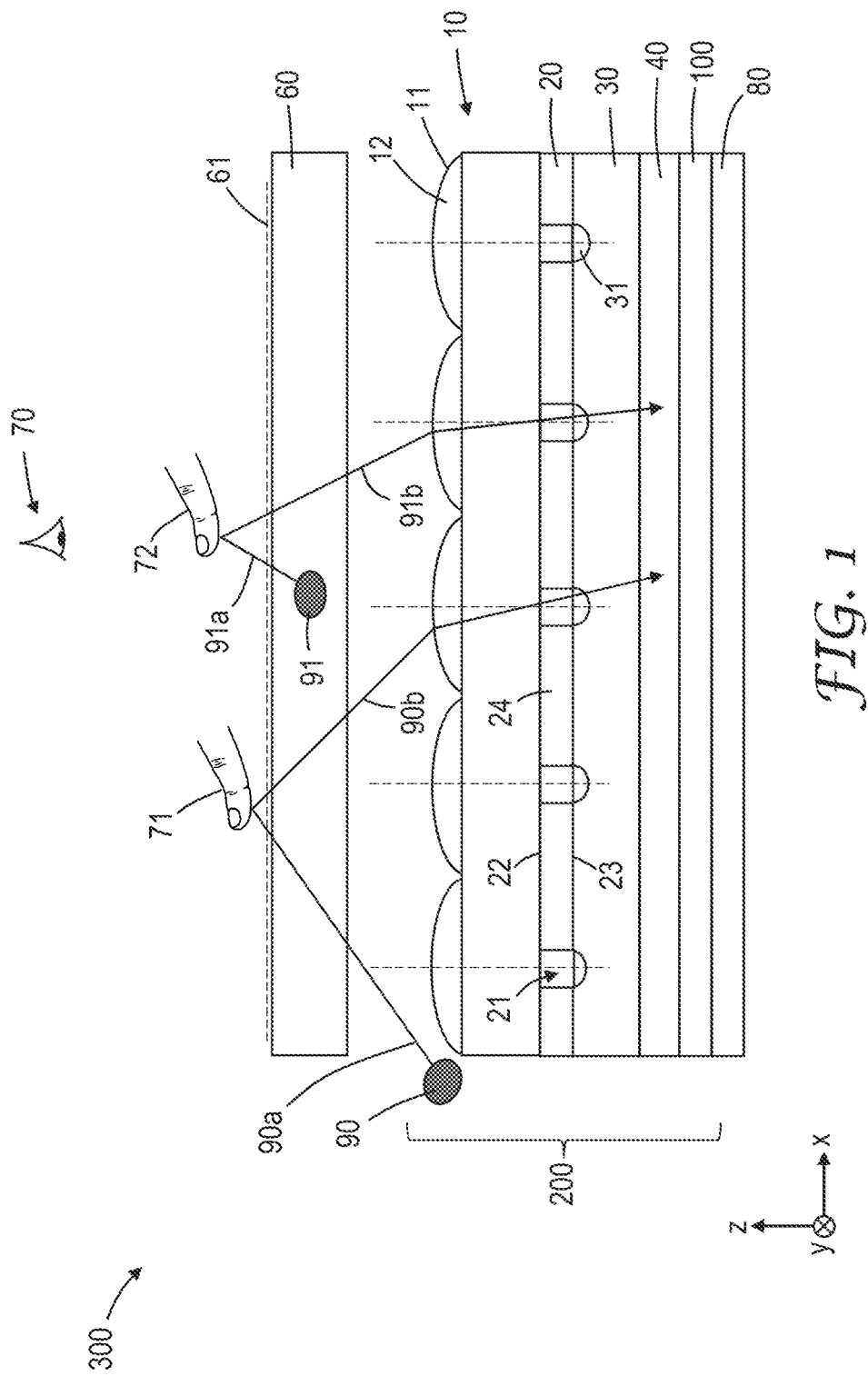

FIG. 1 illustrates a display system (300), for instance, a fingerprint sensing display system for sensing a finger (71, 72) of a user (70) applied to the display system (300). The display system (300) includes a display panel (60) disposed on an optical stack (200). The display panel (60) may be disposed to be substantially coextensive in length (x-axis) and width (y-axis) with the optical stack (200). In some embodiments, the optical stack (200) may have an integral construction. The display panel (60) is configured to display an image (61) for viewing by the user (70).

The display system (300) may further include a capacitive or optical sensor (80) [e.g., a complementary metal oxide semiconductor (CMOS) or thin film transistor (TFT) or organic photodiode (OPD)] for sensing the finger (71, 72) of the user (70). The optical sensor (80) may be disposed on the optical stack (200) opposite the display panel (60). For instance, the sensor (80) may be bonded to the optical stack (200) via an adhesive layer (100).

The display system may further include a light source (90, 91) configured to emit light (90a, 91a) toward the finger (71, 72) of the user (70). The optical sensor (80) is configured to receive at least a portion of the light reflected (90b, 91b) by the finger (71, 72). The light source (90, 91) may be any type of device capable of emitting radiation in a desired wavelength range, for example a diode laser, an LED (light emitting diode), an OLED (organic light emitting diode), or the like. In some embodiments, the light source (90, 91) is an infrared light source configured to emit infrared light.

Figure 2:
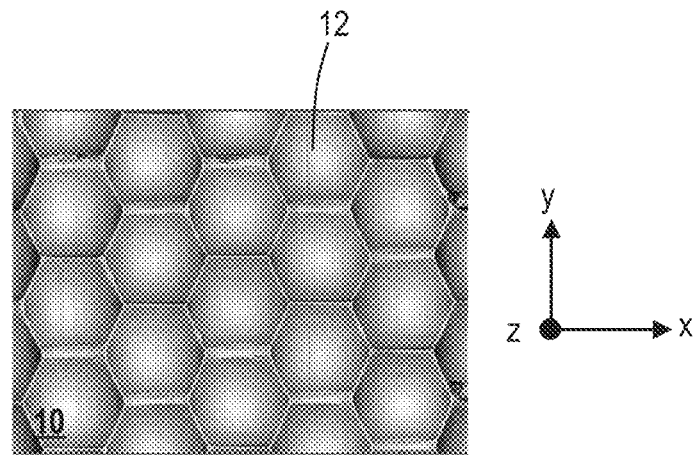
FIG. 2 shows the top down view SEM image of the microlens structures on a substrate according to some aspects.

The optical stack (200) will be further described with reference to FIGS. 1-3. The optical stack (200) includes a lens layer (10). The lens layer (10) may include an outermost structured first major surface (11). The structured first major surface (11) may include a plurality of microlenses (12). The plurality of microlenses (12) may be arranged as a two-dimensional array of microlenses along orthogonal first (x-axis) and second (y-axis) directions across the lens layer (10) as shown in FIG. 2.

A microlens is a lens having at least one lateral dimension (e.g., diameter) less than 1 mm. In some embodiments, the average diameter of the microlenses (12) may be in a range of 5 micrometers to 1000 micrometers. In some instances, the array of microlenses, can have one or more of different sizes, shapes, indices of refraction, and focal lengths. For instance, the array can be regular (e.g., square or hexagonal lattice) or irregular (e.g., random or pseudorandom). In some instances, the microlenses (12) may have substantially equal focal lengths.

The microlenses used in any of the embodiments described herein can be any suitable type of microlenses. In some embodiments, an array of microlenses may include at least one of refractive lenses, diffractive lenses, metalenses (e.g., surface using nanostructures to focus light), Fresnel lenses, symmetric lenses (e.g., rotationally symmetric about an optical axis), asymmetric lenses (e.g., not rotationally symmetric about an optical axis), or combinations thereof. In some instances, at least some of the microlenses may be spherical microlenses. In other instances, at least some of the microlenses may be aspherical microlenses.

A light absorbing layer (20) may be disposed on the lens layer (10). The light absorbing layer (20) may be an optically opaque mask layer defining a plurality of through first openings (21). The first openings (21) can have any suitable shape. In some embodiments, the first openings (21) may include at least one of elliptical pinholes, circular pinholes, rectangular pinholes, square pinholes, triangular pinholes, and irregular pinholes. In some cases, the first openings (21) may include any combinations of these pinhole shapes. A portion of the light (90b, 91b) reflected by the finger (71, 72) may be configured to pass through at least some of the first openings (21).

The first openings (21) can be physical pinholes or optical pinholes, for example. A physical pinhole in an optically opaque material or in a wavelength selective layer, for example, is an opening through the material or layer that allows light from a corresponding microlens (12) to pass through. The first openings (21) may be formed by laser ablation through the microlenses (12), for example. Creating openings in a layer using a laser through a microlens array is generally described in US2007/0258149 (Gardner et al.), for example.

An absorption overcoat can optionally be applied to the optical stack (200) to increase the absorption of energy from the laser. In some embodiments, the light absorbing layer (20) may include a UV-cured polymer material and the plurality of laser ablated first openings (21) may be formed therein. It may be desirable that the UV-cured polymer material has sufficiently high absorption of the laser to be ablated to form the openings. After ablation, it may be desirable that the light absorbing layer (20) including the UV-cured polymer material blocks visible light to a sufficiently high degree to meet the light blocking metrics (FWHM, cross talk etc.).

The light absorbing layer (20) substantially blocks (e.g., blocks at least 60% of light by absorption, reflection, or a combination thereof) incident light in regions (24) between the first openings (21) for at least one wavelength and for at least one polarization state. In some embodiments, the light absorbing layer (20) includes the first openings (21) in a substantially optically opaque material or includes the first openings (21) in a wavelength selective filter, for example. In some cases, the regions (24) of the light absorbing layer (20) between the first openings (21) may have an optical density of greater than about 2 for at least a first visible wavelength in a visible wavelength range extending from about 420 nm to about 680 nm. In some instances, the optical density of the regions (24) of the light absorbing layer (20) between the first openings (21) may be greater than about 2.5, or 3, or 3.5, or 4, or 4.5, or 5, or 5.5, or 6 for at least a first visible wavelength in a visible wavelength range extending from about 420 nm to about 680 nm.

In some aspects, each of the first openings (21) may be a through opening extending from a first major surface (22) of the light absorbing layer (20) facing the lens layer (10) to an opposite second major surface (23) of the light absorbing layer (20). The first openings (21) are in a one-to-one correspondence with the microlenses (12). For instance, each first opening (21) in an array of first openings can be considered to be aligned in a one-to-one correspondence with each microlens (12) in an array of microlenses if each first opening (21) in the array of first openings is disposed to receive light from a corresponding microlens (12) (e.g., incident on the microlens from a fixed direction) in the array of microlenses. In some embodiments, light from a fixed direction is directed by each microlens (12) in the array of microlens primarily to a corresponding first opening (21) in the array of first openings. In some embodiments, each microlens (12) may be symmetric (e.g., about an optical axis passing through a center of the microlens) and each first opening (21) may be disposed directly under a center of the microlens (12).

In some embodiments, a first optical adhesive layer (30) is disposed on the second major surface (23) of the light absorbing layer (20). The first optical adhesive layer (30) may be disposed to make physical contact with the light absorbing layer (20). The first optical adhesive layer (30) may be an optical clear adhesive (OCA). OCA compositions are generally described in US 2018/0265748 (Behling et al.).

In some embodiments, OCA compositions are selected to prevent material flow into openings under accelerated temperature and humidity exposures. The adhesives are similar to those described in U.S. Pat. No. 10,941,321. It was found that these adhesives were not able to prevent flow of the adhesive into pinholes. Therefore, the adhesive compositions of the current disclosure were developed that have a higher modulus and a lower (<0.2) tan delta at 70° C. than those described in U.S. Pat. No. 10,941,321. Such adhesives are described in the co-pending application filed on the same day as the present disclosure.

In some embodiments, the curable adhesive composition comprises: a curable (meth)acrylate copolymer having a weight average molecular weight in a range of 100,000 to 400,000 Da; an optional photoinitiator; and a co-curable additive mixture, where the additive mixture comprises: at least one epoxy (meth)acrylate oligomer; at least one amine-functional (meth)acrylate; and at least one urethane (meth)acrylate oligomer.

Also disclosed are articles that contain the curable adhesive composition disposed on a substrate. In some embodiments, the substrate comprises an array of openings, where the curable adhesive composition does not flow into the openings, but rather in some embodiments forms an elevated area above the opening.

As used herein, the term "adhesive composition" can refer herein to an adhesive that contains a curable (meth)acrylate copolymer and/or a cured (meth)acrylate copolymer. In many embodiments, the adhesive composition is a pressure-sensitive adhesive composition.

In many embodiments, the adhesive compositions are pressure-sensitive adhesive compositions. According to the Pressure-Sensitive Tape Council, pressure-sensitive adhesives (PSAs) are defined to possess the following properties: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature. Materials that are merely sticky or adhere to a surface do not constitute a PSA; the term PSA encompasses materials with additional viscoelastic properties. PSAs are adhesives that satisfy the Dahlquist criteria for tackiness, which means that the shear storage modulus is typically $3\times10^5$ Pa (300 kPa) or less when measured at 25° C. and 1 Hertz (6.28 radians/second). PSAs typically exhibit adhesion, cohesion, compliance, and elasticity at room temperature.

As used herein, the term "room temperature" refers to a temperature of about 20° C. to about 25° C. or about 22° C. to about 25° C.

Figure 3:
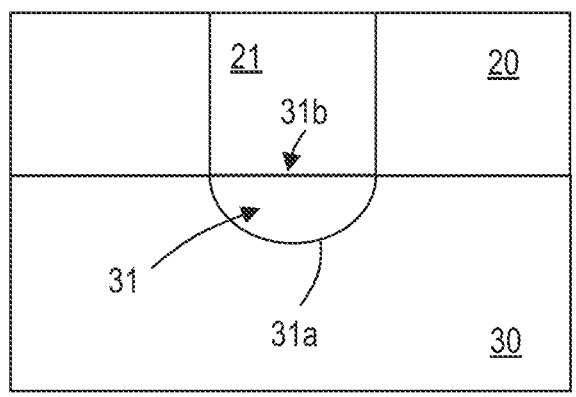
FIG. 3 schematically shows a cross-sectional view of a section of the display system according to some embodiments.

As best seen in FIGS. 1 and 3, the first optical adhesive layer (30) may define a recess (31) at each of the first openings (21). The recess may be of any desired shape and configuration having a closed bottom (31a) and an opposite open top (31b) open to the first opening (21). The desired optical performance can be obtained by design and selection of the OCA and either filling the first openings (21) with OCA or maintaining air inside the first openings (21). In some aspects, a low modulus OCA has been found to fill the first openings (21) while a high modulus OCA has been found to maintain air within the first openings (21).

In some cases, at least 80% of a total volume of each of the recess (31) and the first opening (21) corresponding to the recess (31) may be filled with air. In some cases, at least 85%, or 90%, or 95%, or 96%, or 97%, or 98%, or 99% of a total volume of each of the recess (31) and the first opening (21) corresponding to the recess (31) may be filled with air.

Figure 4:
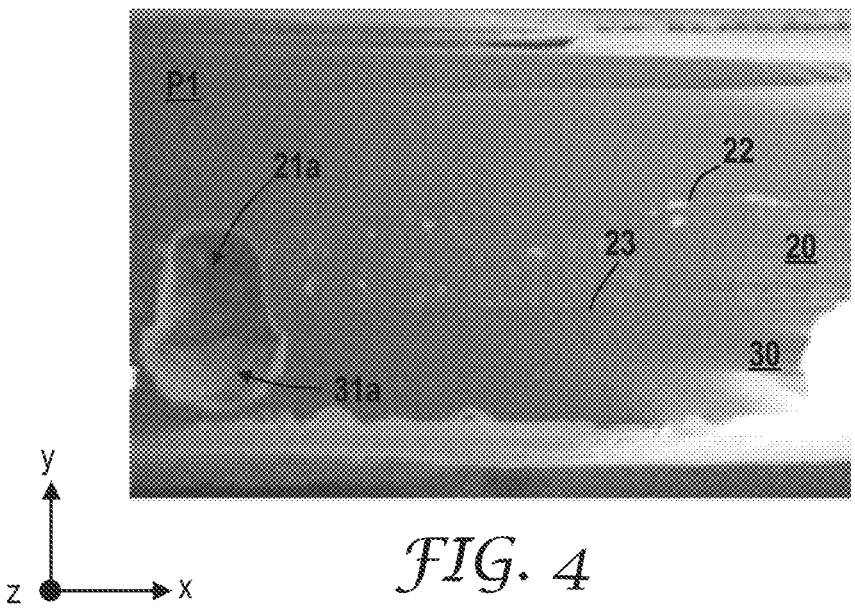
FIGS. 4-5 are exemplary scanning electron micrographs of cross sections of the optical construction in different planes.
Figure 5:
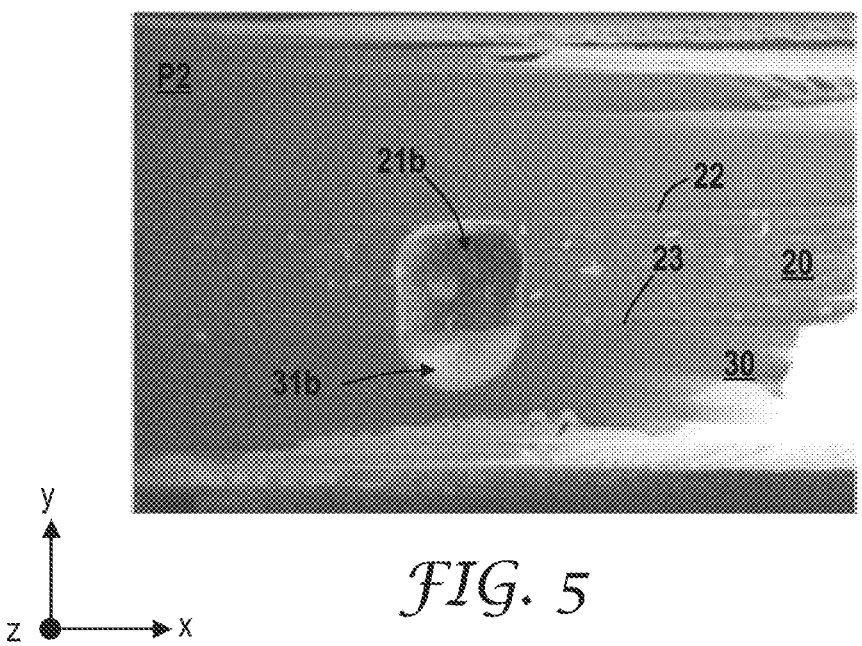

The scanning electron micrographs of cross-sections in a plane (P1, P2) of the optical stack illustrated in FIGS. 4 and 5 shows the light absorbing layer (20), the first opening (21a, 21b) extending from a first major surface (22) of the light absorbing layer (20) to an opposite second major surface (23) of the light absorbing layer (20), and the recess (31a, 31b) corresponding to the first opening (21a, 21b) formed in the first optical adhesive layer (30).

In some embodiments, in the cross-section of the optical construction in a plane (P1, P2) bisecting one of the first openings (21a, 21b) and the recess (31a, 31b) corresponding to the first opening, the recess extends across at least 70%, or 75%, or 80%, or 85%, or 90%, or 95% of the first opening (21a, 21b).

In some embodiments, the optical stack (200) may include an optical filter (40). The optical filter (40) may be bonded to the light absorbing layer (20) by the first optical adhesive layer (30). Optical filters using multilayer optical film interference filters are generally described in PCT Pub. No. WO 2018/013363 (Wheatley et al.).

Figure 6:
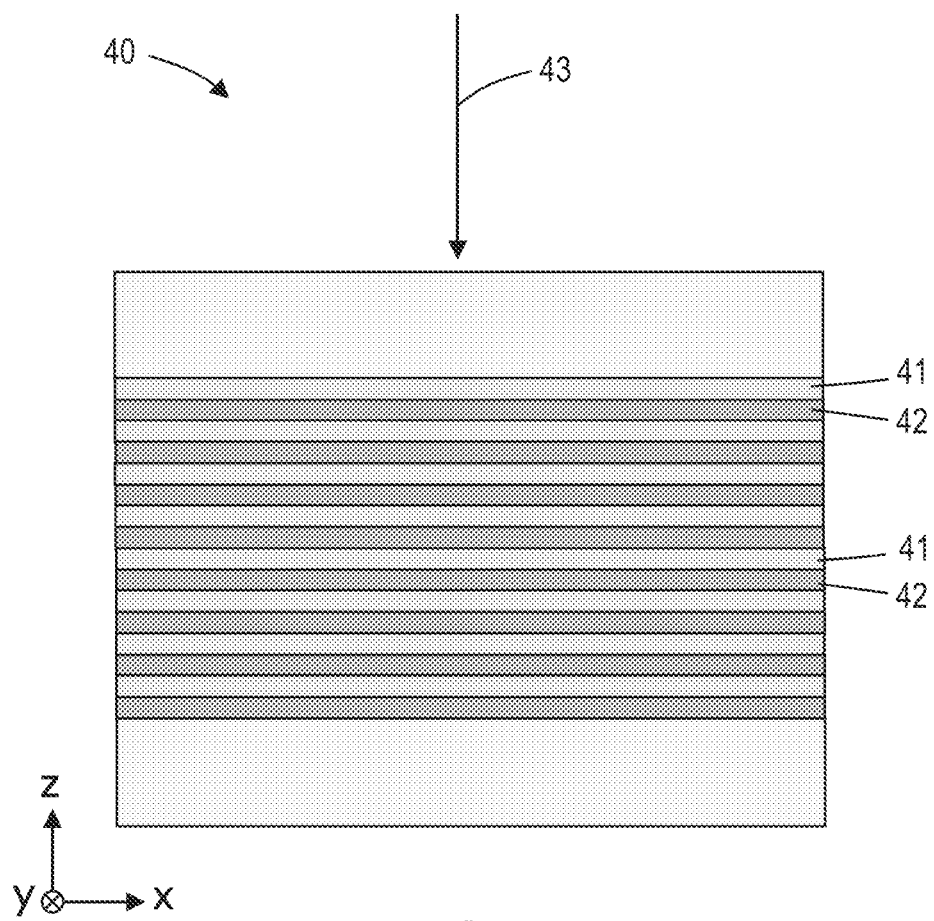
FIG. 6 schematically shows the construction of an optical filter of the optical construction according to some aspects.

In some aspects, the optical filter (40) includes a plurality of polymeric layers (41, 42) as shown in FIG. 6. The polymeric layers (41, 42) may number at least 10, or 20, or 30, or 50, or 100, or 150, or 200, or 250, or 300 in total. Each of the polymeric layers (41, 42) may have an average thickness of less than about 500 nm. In some instances, the average thickness of each of the polymeric layers (41, 42) may be less than about 450, or less than about 400, or less than about 350, or less than about 300, or less than about 250, or less than about 200 nm.

Figure 7:
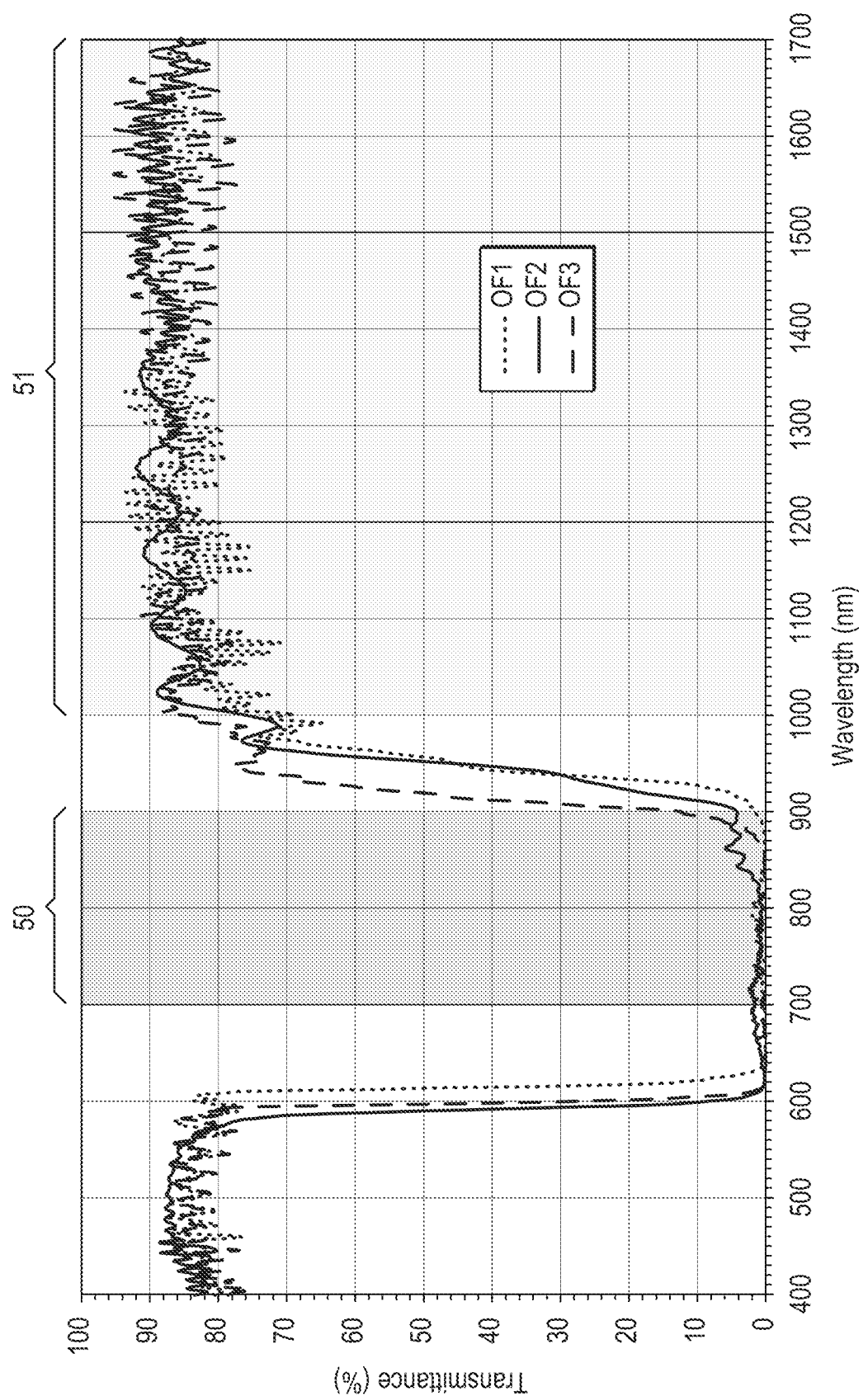
FIG. 7 shows the optical transmission curves of three types of optical filters that can be included in the optical construction.

For a substantially normally incident light (43), the optical filter (40) according to one or more embodiments may have an optical transmission as graphically shown in FIG. 7. Different optical transmission curves based on different types of optical filter configurations (OF1, OF2, OF3) are shown in FIG. 7. The wavelength spectrum of the light transmitted by the optical filter (40) includes at least a visible wavelength range extending from about 420 nm to about 680 nm, a first infrared wavelength range (50) and a second infrared wavelength range (51).

For a substantially normally incident light (43), and for each of first (x-axis) and second (y-axis) orthogonal polarization states, the optical filter (40) may be said to be substantially transmissive in the visible wavelength if more than 40% of light is transmitted in the visible wavelength extending from about 420 nm to about 680 nm. In some instances, the average visible optical transmission of the optical filter (40) in the visible wavelength may be greater than about 45%, or 50%, or 55%, or 60%, or 65%, or 70%, or 75% or 80%.

For a substantially normally incident light (43), and for each of first (x-axis) and second (y-axis) orthogonal polarization states, the average first infrared optical transmission of the optical filter (40) may be less than about 30% in the first infrared wavelength range (50). In some aspects, the first infrared wavelength range (50) is within the wavelength range of 680-1800 nm and may be at least 50 nm wide. In some aspects, the first infrared wavelength range (50) may be at least 75 nm, or 100 nm, or 125 nm, or 150 nm, or 175 nm, or 200 nm wide. In some instances, the average first infrared optical transmission of the optical filter (40) in the first infrared wavelength range (50) may be less than about 25%, or less than about 20%, or less than about 15%, or less than about 10%, or less than about 5%, or less than about 2%, or less than about 1%.

In other embodiments, for the substantially normally incident light (43), and for each of the first (x-axis) and second (y-axis) polarization states, the optical filter (40) may have an average second infrared optical transmission of greater than about 40% in the second infrared wavelength range (51). The second infrared wavelength range (51) is within the wavelength range of 680-1800 nm and may be at least 50 nm wide. In some aspects, the second infrared wavelength range (51) may be at least 100 nm, or 200 nm, or 300 nm, or 400 nm, or 500 nm, or 600 nm, or 700 nm wide. In some instances, the average second infrared optical transmission of the optical filter (40) in the second infrared wavelength range (51) may be greater than about 45%, or 50%, or 55%, or 60%, or 70%, or 75%, or 80%, or 85%.

In some aspects, a ratio of the average second infrared optical transmission to the average visible optical transmission may be greater than about 0.8. In some other cases, the ratio of the average second infrared optical transmission to the average visible optical transmission may be greater than about 0.9, or greater than about 1, or greater than about 1.1, or greater than about 1.2, or greater than about 1.3, or greater than about 1.4, or greater than about 1.5.

Table 1 provides the experimental optical transmittance values of different types of optical filters (OF1, OF2, OF3) bonded to the light absorbing layer (20) by the first optical adhesive layer (30).

TABLE 1

| Wavelength (nm) | Optical Transmittance (%) | | |
|---|---|---|---|
| | OF1 | OF2 | OF3 |
| 420-680 (Visible wavelength range) | 62.4 | 56.6 | 57.1 |
| 700-900 (First IR wavelength range) | 0.6 | 2.1 | 1.3 |
| 1000-1700 (Second IR wavelength range) | 84.9 | 88.0 | 86.0 |
| Ratio of Second IR wavelength range to visible wavelength range | 1.4 | 1.6 | 1.5 |

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

The invention claimed is:

1. An integral optical construction comprising:
a lens layer comprising a structured first major surface comprising a plurality of microlenses arranged two-dimensionally across the lens layer;
an optically opaque mask layer disposed on the lens layer and defining a plurality of through physical first openings therein, each of the first openings extending from a first major surface of the mask layer facing the lens layer to an opposite second major surface of the mask layer, the first openings in a one-to-one correspondence with the microlenses, regions of the mask layer between the first openings having an optical density of greater than about 2 for at least a first visible wavelength in a visible wavelength range extending from about 420 nm to about 680 nm; and
a first optical adhesive layer disposed on, and making physical contact with, the second major surface of the mask layer, the first optical adhesive layer defining a recess therein at each of the first openings, each recess comprising a closed bottom and an opposite open top open to the first opening corresponding to the recess.

2. The integral optical construction of claim 1, wherein at least 80% of a total volume of each of the recess and the first opening corresponding to the recess is filled with air.

3. The integral optical construction of claim 1, wherein in a cross-section of the optical construction in a plane bisecting one of the first openings and the recess corresponding to the one of the first openings, the recess corresponding to the one of the first openings extends across at least 70% of the one of the first openings.

4. The integral optical construction of claim 1 further comprising an optical filter bonded to the mask layer by the first optical adhesive layer and comprising a plurality of polymeric layers numbering at least 10 in total, each of the polymeric layers having an average thickness of less than about 500 nm, such that for a substantially normally incident light, a first infrared wavelength range that is at least 50 nm wide and is within 680-1800 nm, and for each of first and second orthogonal polarization states, the optical filter has an average visible optical transmission of greater than about 40% in the visible wavelength, and an average first infrared optical transmission of less than about 30% in the first infrared wavelength range.

5. The integral optical construction of claim 4, wherein for the substantially normally incident light, a second infrared wavelength range that is at least 50 wide and is within 680-1800 nm, and for each of the first and second polarization states, the optical filter has an average second infrared optical transmission of greater than about 40% in the second infrared wavelength range.

6. The integral optical construction of claim 5, wherein a ratio of the average second infrared optical transmission to the average visible optical transmission is greater than about 0.8.

7. A display system for sensing a finger of a user applied to the display system, the display system comprising a display panel disposed on, and substantially coextensive in length and width, with the integral optical construction of claim 1, the display panel configured to display an image for viewing by the user.

8. The display system of claim 7 further comprising:
a sensor for sensing the finger of the user, the optical sensor disposed on the integral optical construction opposite the display panel; and
an infrared light source configured to emit an infrared light toward the finger of the user, the sensor configured to receive at least a portion of the infrared light reflected by the finger.

9. The display system of claim 8, wherein the sensor is bonded to the integral optical construction via an adhesive layer.

* * * * *

UNITED STATES PATENT AND TRADEMARK OFFICE
CERTIFICATE OF CORRECTION

PATENT NO. : 12,094,238 B2
APPLICATION NO. : 18/195475
DATED : September 17, 2024
INVENTOR(S) : Kristy Ann Gillette et al.

Page 1 of 1

It is certified that error appears in the above-identified patent and that said Letters Patent is hereby corrected as shown below:

In the Claims

<u>Column 8</u>

Line 30 (approx.), In Claim 5, delete "at least 50" and insert -- at least 50nm --, therefor.

Line 46-47 (approx.), In Claim 8, delete "optical sensor disposed" and insert -- sensor disposed --, therefor.

Signed and Sealed this
Twenty-fifth Day of March, 2025

Coke Morgan Stewart
*Acting Director of the United States Patent and Trademark Office*